E. RAMSAY.
AUTOMATIC ROLLING DUMP.
APPLICATION FILED FEB. 17, 1921.

1,425,051.

Patented Aug. 8, 1922.
5 SHEETS—SHEET 1.

INVENTOR
Erskine Ramsay
BY
ATTORNEY

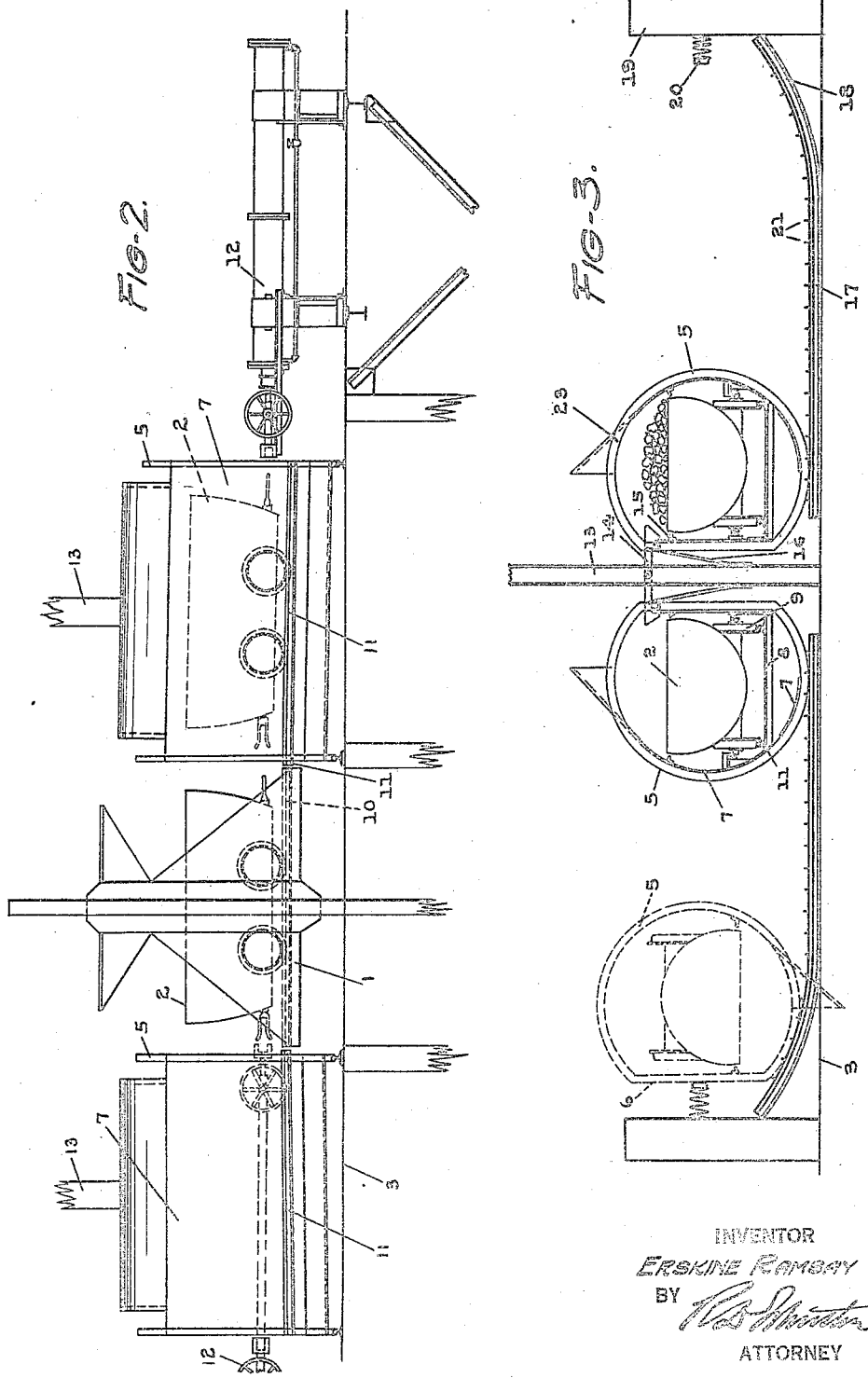

E. RAMSAY.
AUTOMATIC ROLLING DUMP.
APPLICATION FILED FEB. 17, 1921.
1,425,051
Patented Aug. 8, 1922.
5 SHEETS—SHEET 5.
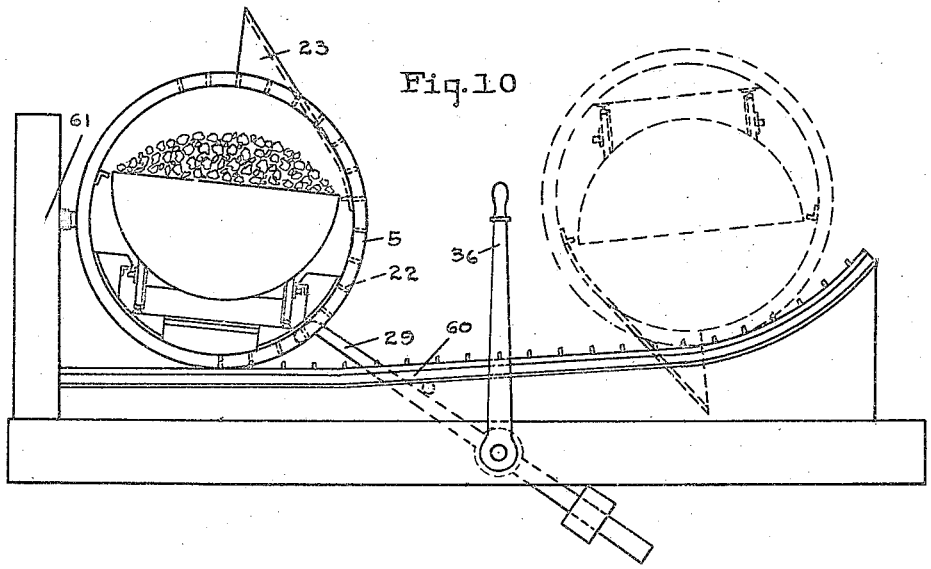
Fig. 10
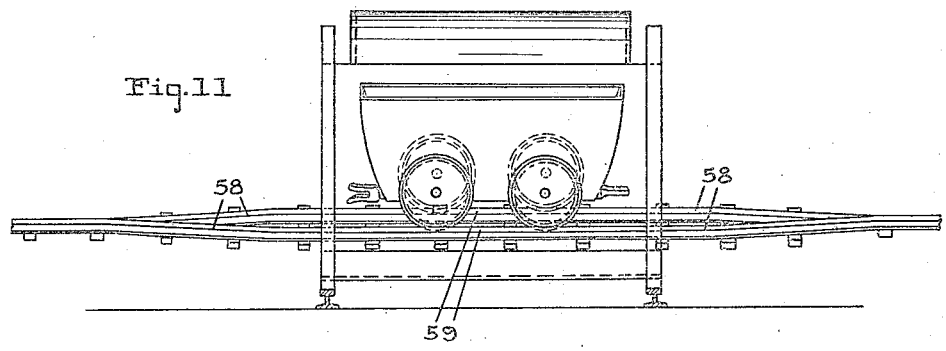
Fig. 11
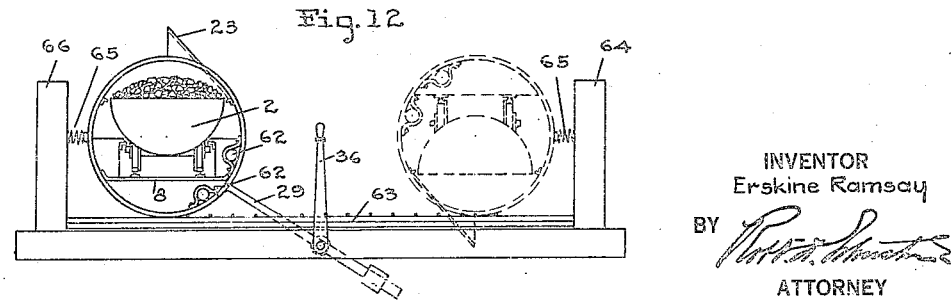
Fig. 12
INVENTOR
Erskine Ramsay
BY 
ATTORNEY

UNITED STATES PATENT OFFICE.

ERSKINE RAMSAY, OF BIRMINGHAM, ALABAMA.

AUTOMATIC ROLLING DUMP.

1,425,051.  Specification of Letters Patent.  Patented Aug. 8, 1922.

Application filed February 17, 1921. Serial No. 445,646.

*To all whom it may concern:*

Be it known that I, ERSKINE RAMSAY, a citizen of the United States of America, residing at Birmingham, in the county of Jefferson and State of Alabama, have invented certain new and useful Improvements in Automatic Rolling Dumps, of which the following is a specification.

This invention relates to rotary dumps of the rolling type wherein it is proposed to utilize gravity as the power means for effecting an automatic operation of the dump.

The rolling dumps have special advantages under many mining conditions, such, for instance, as where it is desired to more effectively distribute the coal in bins, and in Letters Patents heretofore issued to me, Nos. 721,089, and 1,358,175, I have shown rolling dumps which have employed various power means for their operation.

It is the object of this application so to design these rolling dumps as to obtain an automatic gravity operation thereof.

In its simplest form, my invention contemplates bringing the dump under control of gravity either by having the dump containing the mine car unbalanced, or, where the dump is balanced, by supporting it upon an inclined track, or utilizing both principles in combination. By the foregoing means, the power of gravity is made available to start the dump from its initial position and to rotate it sufficiently to dump the contents of the car therein. For the return of the dump this may be accomplished either by the reverse inclination of the track or by the reversely unbalanced condition of the inverted dump with the empty car therein, or by a spring buffer to arrest and start the dump back, or by the combination of one or more or all of these agencies.

My invention further contemplates the obtaining of the dumping operation by the various agencies above described where double tracks are used, the dumps being caused to roll in opposite directions, or, I may utilize the principles of reversely inclined dump tracks with connection between the dumps so that they will roll alternately in opposite directions, or I may provide for a single track with a tilting platform which will enable the dump to be rolled and dumped to either side desired and returned to initial position on the platform by any of the agencies above mentioned, or finally I may utilize a horizontal track for a rolling dump so unbalanced that it will act both to stop and start itself.

My invention further contemplates the provision of an automatic latching means to arrest and hold the dump in initial or car transferring position against the action of gravity or other force tending to roll the dump into dumping position.

It is to be understood that the dump may be of any capacity and that, according to the car handling mechanism and couplings of the cars, it may handle them one at a time or in groups of any desired number of cars which may remain coupled in the dump.

As illustrative of the preferred embodiments of my invention, reference is made to the accompanying drawings, in which :—

Fig. 2 is a side elevation of Fig. 1, and

Fig. 3 is an end elevation of Fig. 1 with the transfer rams omitted.

Figs. 10 and 11 are end and side views, respectively, of a dump unbalanced by the tilting of the car tracks therein to one side.

Fig. 12 shows a dump unbalanced by weights and operated thereby on a horizontal track.

Similar reference numerals refer to similar parts throughout the drawings.

Figure 1:
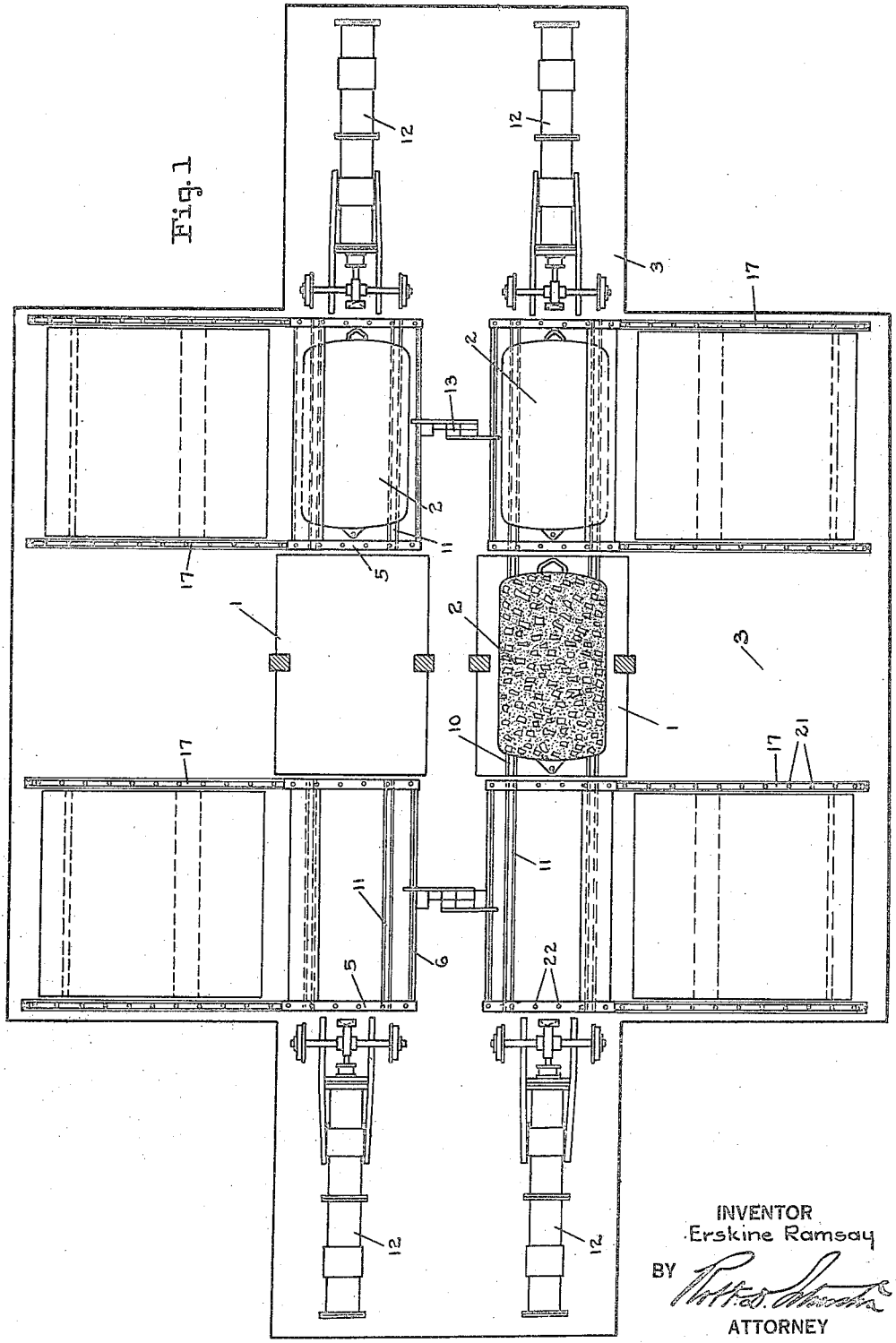
Fig. 1 shows in plan view a shaft tipple with suitable rams for transferring the cars between the mine cages and the dumps.

As illustrated in Figs. 1 to 3, I show shaft hoisting cages 1 which are adapted to handle the mine cars 2 and at each end of each cage on the tipple 3 is mounted a rolling dump. Each dump is made up of a cage having end rings 5 with flattened faces 6 at one side, these rings being cross connected by plates 7 and provided with track supports 8 onto which the wheels 9 of the mine cars 2 are adapted to be run from the track sections 10 on the cages. The dump supports carry track sections 11 which will align with the cage tracks 10 when the dump is in car receiving position. I show these dumps arranged in a pair at opposite ends of each cage and I show a suitable ram 12 for each dump which is adapted to push all empty cars from its dump onto the cage opposite the dump and to push a loaded car or cars on said cage ahead of the empty car into the opposite dump. When the two adjacent dumps on the same side of the shaft are in initial or "car receiving" position, as shown in Fig. 3, their flat faces 6 are juxtaposed to a vertical frame member 13 which carries latches 14 adapted to engage and hold the plates 15 on the flat side of the two dumps. Also this upright member 13 carries a flat spring 16 for each dump which acts as a buffer and which is held under compression while the dump is latched in initial position with its weight so distributed as to unbalance it. The tracks 17 for each dump to roll on comprise a horizontal portion terminating at its end remote from the frame member 13 with an upwardly curved track section 18 which terminates adjacent to a frame member 19 carrying a buffer spring 20. Upon releasing its respective latch 14 a dump will be initially started by its unbalanced condition and by the power stored up in its spring 16 and as it turns with the loaded car therein it will be more and more unbalanced, because the center of gravity of the dump when loaded is above the dump center, thus gathering momentum while traversing the horizontal section of the track. As the dump completes its half rotation it rides up the incline 18 until its flat face 6 strikes the buffer 20. This, in conjunction with the action of gravity, brings the dump to rest at a higher level than its initial position, and both the spring buffer and gravity act on the reversely unbalanced dump to start the dump back to initial position when its face 6 will strike and compress the buffer spring 16 and latch itself automatically by means of the latch 14. The center of gravity of the inverted empty car and dump being above the center of the dump as the latter starts to roll back it becomes unbalanced in the direction of its return travel. To prevent possibility of slippage of the dump on its tracks, the tracks 17 are preferably provided with equidistantly spaced teeth or points 21 which engage in equidistantly spaced sockets 22 in the dump rings 5. If desired each dump may be provided with a chute 23 of such size and so disposed relatively to the top of the loaded car that it will receive the coal as it commences to fall from the car and will hold it to the desired extent and for the desired time to make use of the coal in further unbalancing the dump, with the result that the coal has a shorter distance to fall with less breakage and the dump has more momentum imparted to it so as to insure its effective operation.

Figure 4:
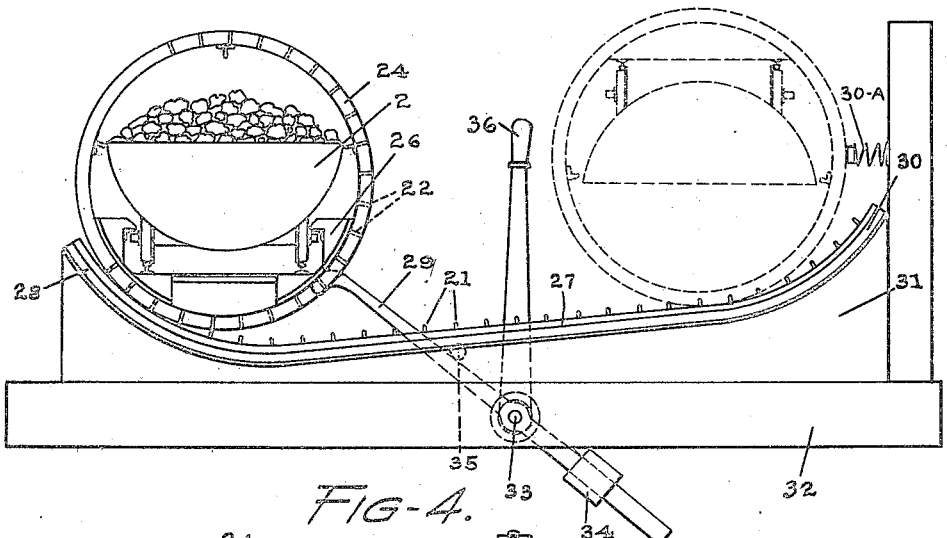
Figs. 4 and 5 are end and plan views of a modified type of rolling dump utilizing a balanced dump on a sloping track having reversely inclined ends.
Figure 5:
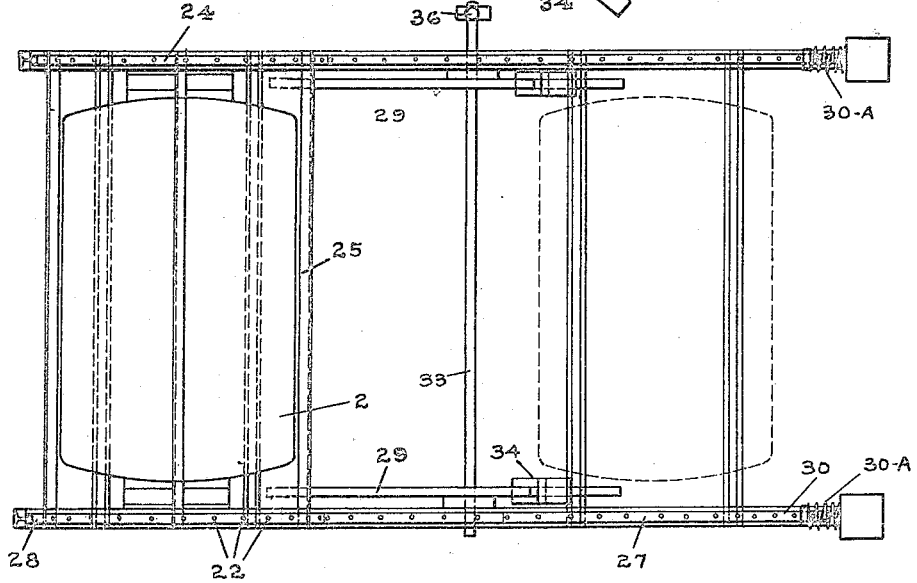

Referring to the dumping mechanism illustrated in Figs. 4 and 5, I show a dump formed by annular end rings 24 suitably cross connected by plates 25 and provided with holddowns 26 for the car 2 therein which is shown disposed in the center of the dump and in such position as to have the dump center of gravity when loaded above the center of the dump and when unloaded below the center of the dump. The rings are provided with the holes 22 in which the pins 21 on a track 27 engage, this track being provided with an upwardly curved end 28 upon which the cage is adapted to rest and to be held by an automatic dog 29 in its initial position. The track slopes gradually upwardly to the right and if desired its other end 30 may be curved upwardly the track being supported on suitably shaped bed blocks 31 mounted on tipple timbers 32. The automatic dog 29 is fast on a shaft 33 extending through the tipple timbers 32 and the lower end of the dog is provided with an adjustable counterweight 34 which swings it normally upwardly into engagement with a stop pin 35. The shaft 32, upon which the several dogs 29 are made fast in any suitable manner, turns with the dogs in response to the weights 34 and is provided with a handle 36 disposed beyond the path of the dump by means of which the shaft can be turned to release the dump and to permit it to commence its rolling motion. As the dogs are tripped, the cage being supported on the sharply inclined track 28, will be unbalanced and will at once commence to roll down the track and in doing so the dump becomes further unbalanced in that direction and is given a considerable momentum which inverts the car and carries the dump to a higher level up the inclined track 27 or the curved end 30 thereof where it gradually comes to rest or is stopped by spring buffers 30ª with the center of gravity of the empty dump above its center. As the dump commences to roll back down the inclined track 27 it becomes overbalanced to the left and gains therefrom sufficient momentum to cause it to roll far enough up the curve 28 to permit the gravity dogs 29, which were depressed by the dump as it rolled over them, to shift into position in line with a radius of the dump so that they will engage and hold the dump in its initial or car receiving position, whereupon the empty car can be removed and another loaded car introduced in the dump and the operation repeated without the employment of any mechanical power.

Figure 7:
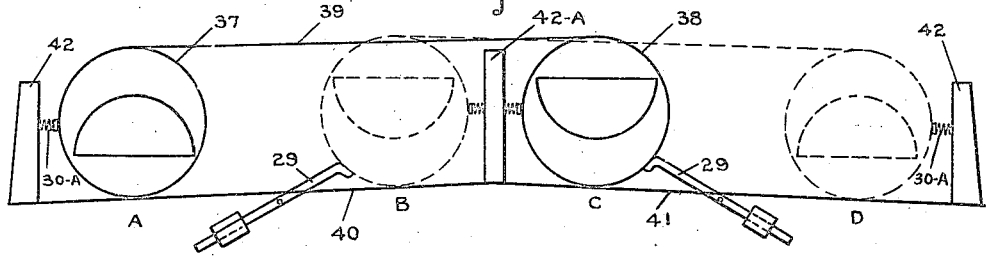
Fig. 7 illustrates a double track dumping arrangement in which the dumps are connected for joint movement.

In Fig. 7 I show a two track dumping arrangement comprising a dumping cage 37 for one track and a dumping cage 38 for the other track, which dumps are connected by an endless chain, rope or cable 39 adapted to wind onto one drum as it is unwound from the other. The lines 40 and 41 indicate the level of the reversely and downwardly sloping tracks for the dumps 37 and 38, respectively, and for each dump I provide an automatic dog 29. At the lower ends of each track I provide a suitable stop 42.

The operation of this arrangement is as follows. Assuming the loaded car is in the dump 38 in position C and that the inverted empty car is in the dump 37 in position A, upon tripping the dog for the dump 38, the inclination of the track 41 will cause the latter dump to roll to the right and by the connection 39 will pull the dump 37 with the empty car back up its respective track 40 to position B, and in doing so will oppose the inertia of the dump 37 to the action of gravity on the dump 38 so that the two dumps will act effectively together. The dump 38 in position D having dumped the car therein, the empty car is removed from the dump 37 in position B and a loaded car replaced, whereupon the dog holding the dump 37 in position B is released and the dump 38 is restored to car receiving position C while the car in the dump 37 is dumped in position A. A spring buffer 30ª, such as shown in Fig. 3, is applied to the stop posts 42. A timber 42ª in center between the tracks is provided with buffer springs to arrest the dumps in positions B and C.

Figure 9:
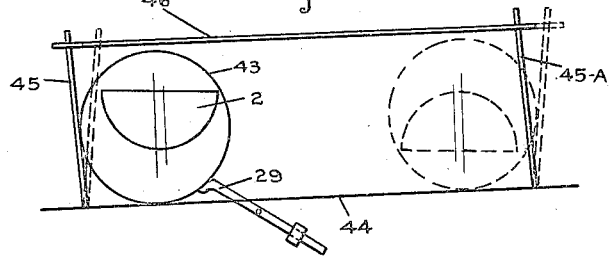
Fig. 9 shows a single track dump unbalanced with a straight inclined track and cross connected spring stops.

In Fig. 9 I show a single track dump comprising a dump 43 in which the center of car 2 is offset to the right of the dump center so as to unbalance the dump to the right. The dump rolls on any inclined track 44 and is shown held in engagement with a spring stop 45 by means of an automatic dog 29. This spring stop 45 is cross connected overhead by a bar or flexible connection 46 to a similar spring stop 45ª at the upper end of the track. In the position shown the stop 45 is under tension which in turn has been transmitted to the stop 45ª by connection 46, and both would therefore thrust the car to the right as soon as it is released by the dog 29. Upon releasing the dog the action of the springs assisted by the unbalanced condition of the dump will cause it to roll to the right up the inclined track until the car is inverted, which takes place at the time it strikes the other stop 45ª. With the car inverted the dump is unbalanced to the left. The action of the spring stops 45 and 45ª and the unbalanced condition of the dump will start the dump rolling back down the track to the left and it will roll back over the dog 29 and against the spring 45 and will be brought to rest thereby after the dog has automatically assumed position to engage and hold it in initial position.

Figure 8:
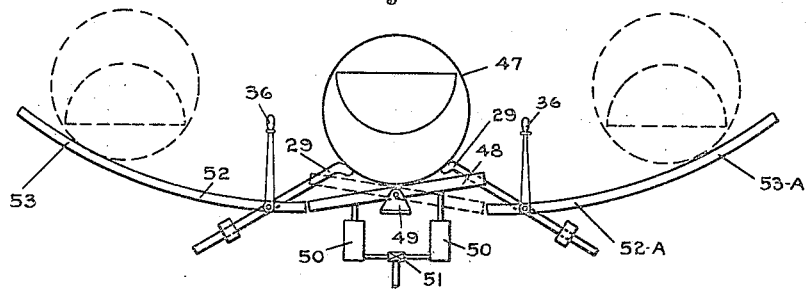
Fig. 8 illustrates a single track dump with a tilting platform adapted to make the dump roll to either side desired.

In Fig. 8 I show a single track dump adapted to roll to either side for the better distribution of the material into a bin or receptacle below. In this arrangement a dump 47 has a car in balanced position therein and the dump in initial position rests upon the tilting platform 48 journaled on a center bearing 49 and adapted to be rocked to either side by the air, hydraulic or steam cylinders 50 under control of the reversing valve 51. As shown, this platform carrying the intermediate track section is inclined to the left and the left hand dog 29 is holding the dump on the inclined track. Upon tripping this dog the dump will roll to the left and along the track 52 and up the inclined end 53 of this track where it will come to rest at a level higher than its initial position and will roll back, gaining sufficient momentum from the fact that its center of gravity with the inverted empty car is above the center of the dump and will cause it to roll back down the track 52 and far enough up the track on the platform to be engaged and held by the left hand dog 29. Upon removing the empty and introducing another loaded car, by reversing valve 51 the platform 48 can be shifted to dotted position and by tripping the right hand dog 29 the dump will roll to the right down and up on track 52ª and be dumped with the same operation, and on returning will be held in initial position by the right hand dog 29.

Figure 6:
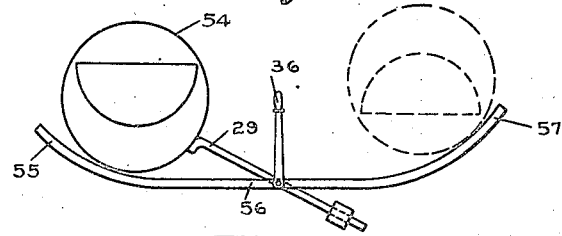
Fig. 6 illustrates a dump similar to Fig. 4, except that the track way between the reversely inclined ends is level.

In Fig. 6 I show a dumping mechanism comprising a dump 54 in which the car is disposed in balanced position in the dump with the center of gravity of the loaded dump above the center of the dump. In initial position the cage is held on the upwardly curved end 55 of the track 56 by the dog 29. Upon releasing the dog the dump rolls across a horizontal intermediate portion of the track and up the reversely curved end 57 of the track when the center of gravity of the empty dump being above the center of the dump will co-operate with the inclined end 57 of the track to impart the requisite momentum to the dump to cause it to run back past the dog 29 and be latched in its initial position. This arrangement differs from Fig. 4 in that the track is level throughout its intermediate portion.

In Figs. 10 and 11 the car is disposed on center in the dump but the tracks 58 as they approach and leave the dump are tilted to one side so that the car rests in the dump on track sections 59 disposed to tilt it to one side which unbalances it in that direction, due to the fact that the center of gravity of the dump and loaded car is above the dump center. The track 60 on which the dump rolls is level under the dump's initial position and slopes upwardly therefrom so that when dog 29 is tripped the dump will roll back until arrested by the bumper post 61 and held there by dog 29.

In Fig. 12 I show the dump with the car on center and a pair of counterweights 62 preferably in the form of hollow cylinders adapted to receive weights, which cylinders are fastened to the inside faces of the rings 5 above and below the car supports 8 and on the side towards which the dump is to roll on its level track 63 when dog 29 is tripped. The dump is arrested by a spring buffer 65 on the stop post 64 with the car inverted, the dump's center of gravity then being above the dump center, and its weights unbalancing it to the left it will roll in that direction until arrested by the spring buffer 65 on post 66 and held there by the dog 29.

In all the various arrangements described the rolling motion is imparted to the dump without the utilization of power, thus enabling me to obtain an automatic operation of the unlatched dump and to erect and operate the dumps at a greatly reduced cost by reason of the absence of any power mechanism. It is desirable that a positive engagement between dump rings 5 and their tracks by use of pins 21 and sockets 22 should be preserved throughout to prevent the possibility of slippage, causing the dump to present its tracks out of alignment with the tipple tracks when in its car receiving position. Obviously the mechanical construction of the dump or the latch means employed for holding it in initial position may be widely varied.

The various modifications of my invention utilize one or more of the following means to cause the dump to roll back and forth on its supporting tracks, viz:—

1. An inclined track for supporting the dump.
2. An off center car in dump.
3. Energy stored in a spring buffer.
4. Counterweights on the dump.
5. A tilted car track in dump.

My invention contemplates the utilization of any one or more, or all of said agencies to produce the rolling movement of the dump in either or both directions. Moreover, the center of gravity of the loaded or inverted empty dump need not be above its center but when it is the shifting center of gravity as the dump rolls will unbalance it so as to co-act with said agencies to roll the dump on its tracks.

Having thus described my invention, what I claim as new and desire to secure by Letters Patent, is:—

1. The combination with a dump having means to receive and hold a car to be dumped, of a track on which the dump is adapted to roll laterally to dump the car, means to hold the dump in initial position on said track, and means responsive to gravity for causing the dump when released to roll to one side on its track to dump the car and automatically return to initial position.

2. The combination with a dump having means to receive and hold a car to be dumped, of a track on which the dump is adapted to roll laterally to dump the car, means to hold the dump in initial position on said track comprising a spring buffer which opposes a releasable latch, and means responsive to gravity for causing the dump when released to roll to one side on its track to dump the car and automatically return to initial position.

3. A dumping mechanism as described in claim 1, in which the center of gravity of the dump and loaded car and of the inverted dump and empty car is above the center of the dump.

4. A dumping mechanism in accordance with claim 1, in which the center of gravity of the dump with a loaded car therein is so disposed relatively to a vertical plane through the point of contact of the dump track as to unbalance it in the direction in which it is intended to roll on said track.

5. The combination with a rolling dump, of means to receive and hold a loaded car therein, a dump supporting track having an upward incline at one end, stop means to hold the dump in initial position on said track, and means acting by gravity on the released dump to roll it up said incline to dump and return it to initial position on said track.

6. A dumping mechanism in accordance with claim 5, in which a spring buffer co-acts with the inclined track up which the dump rolls as it dumps to return the dump to initial position.

7. A dumping mechanism in accordance with claim 5, in which the track way is in part horizontal and in part inclined upwardly towards the dumping end of the track.

8. A dumping mechanism in accordance with claim 1, in which said means for returning the cage to initial position comprises a spring stop.

9. A dumping mechanism in accordance with claim 1, in which said means for returning the cage to initial position comprises a spring buffer and an inclined track portion.

10. In combination, a rolling dump, a track on which the dump is adapted to roll laterally, a latch to hold the dump in initial position, means to stop the dump when it tends to roll back past its initial position, which means is adapted to be opposed by the latch which holds the dump in initial car transferring position, and means at the far end of said track to assist in returning the dump from dumping to initial position.

11. In combination, a rolling dump adapted to receive and hold a car, a track portion upon which the dump is adapted to roll laterally, automatic means to start the dump rolling on said track to invert a car therein, means effective at the end of the lateral dumping movement to reverse it, and an automatic latch to hold the dump with a loaded car therein in initial position against the action of said automatic means.

12. A dump mechanism in accordance with claim 1, in which the gravity means to start the loaded dump on its rolling movement is supplemented by the energy stored in a spring buffer adapted to arrest the return movement of the unloaded dump.

In testimony whereof I affix my signature.

ERSKINE RAMSAY.

Witness:
NOMIE WELSH.